March 5, 1968 ATSUSHI NISHIYAMA ET AL 3,372,213
METHOD OF MANUFACTURING OXIDE NUCLEAR FUEL CONTAINING A BORIDE
Filed Dec. 11, 1964 2 Sheets-Sheet 2

INVENTORS
ATSUSHI NISHIYAMA AND
TOSHIO KASAMATSU
BY William D. Carothers
THEIR ATTORNEY United States Patent Office  
3,372,213  
Patented Mar. 5, 1968

3,372,213  
METHOD OF MANUFACTURING OXIDE NUCLEAR FUEL CONTAINING A BORIDE  
Atsushi Nishiyama, Kawachi, and Toshio Kasamatsu, Nishinomiya, Japan, assignors to Sumitomo Electric Industries, Ltd., Osaka, Japan, a company of Japan  
Filed Dec. 11, 1964, Ser. No. 417,719  
Claims priority, application Japan, Dec. 16, 1963, 38/67,386, 38/67,387  
5 Claims. (Cl. 264—.5)

The present invention relates to a method of manufacturing a new nuclear fuel material containing a burnable poison. In more particular, it is an invention to provide a homogeneous nuclear fuel material containing a burnable poison by mixing, pressing and sintering, such a nuclear fuel compound as uranium dioxide with such a burnable poison as a boron compound.

Many attempts have hitherto been conceived in an effort by obtain an economically advantageous nuclear fuel by prolonging the fuel life through the addition of a burnable poison to the nuclear fuel elements. As a matter of fact, however, no success has yet been achieved in such an attempt, it being technically difficult to have a burnable poison contained in a nuclear fuel compound of, for instance, uranium dioxide.

For the purpose of having boron contained in uranium dioxide as a burnable poison, the oxide, carbide, nitride, etc. of boron have hitherto been used. However, these compounds lack chemical stability. For instance, if an attempt is made to have a boron compound contained in sintered uranium dioxide, for example, it either reacts with uranium dioxide or becomes decomposed during the sintering process, so that it is almost impossible to have such a boron compound retained in the end sintered product. No method has so far been discovered for making a sintered product of a suitable burnable poison for addition to or containing nuclear fuel material or to obtain the suitable burnable poison containing nuclear fuel by the vibratory composition of a homogeneous powder mixture of a burnable poison and nuclear fuel compound. Although methods are known in which boron is added directly into the stainless steel cladding tube which contains the nuclear fuel material, they do not make it possible to disperse the burnable poison uniformly in the nuclear fuel material, thus failing to let the burnable poison act efficiently.

The present invention eliminates this drawback by using a metallic boride as a burnable poison and producing a homogeneous mixture in a sintered product consisting of a ceramic nuclear fuel material comprising one or more of the following dioxides, such as, uranium dioxide, plutonium dioxide, thorium dioxide, uranium dioxide-thorium dioxide solid solution, uranium dioxide-plutonium dioxide solid solution etc., as nuclear fuel compounds.

That is to say, such a metallic boride as $TiB_2$, $XrB_2$, $CrB_2$, $NbB_2$, $VB_2$, etc. is used as a boron compound, and this and the ceramic powder of a nuclear fuel compound, uranium dioxide, for example, are uniformly mixed and sintered. If the said metallic boride and ceramic powder are sintered in an hydrogen or inert gases in the sintering process, the boron content after sintering is remarkably decreased owing to the small quantity of impurities existing in the sintering atmosphere and it is found difficult to obtain a stabilized product. The present invention, however, secures a constant amount of the boron additive in the nuclear fuel by sintering in a high degree of vacuum of $10^{-3}$ mm. Hg or higher, at a sintering temperature of 1,500° C. or higher; the compacted product obtained by compacting under a pressure of 3 T./cm.$^2$ or more is a uniform mixture of the said metallic boride and ceramics powder.

By the above-mentioned method it is made possible to eliminate almost entirely the reaction between the metallic boride and the nuclear fuel compound, so that it is possible to disperse a requisite quantity of a boride of a fixed grain size in the oxide nuclear fuel material as a burnable poison by selectively employing the requisite quantity of a metallic boride of the desired grain size.

Now we will explain practical embodiments of the present invention in further detail.

A requisite quantity of metallic boride is added to $UO_2$ powder, and these two are mixed uniformly enough in such a mixer as a ball mill or V-type mixer. This mixed powder is compacted into cylindrical pellets, 10–20 mm. in diameter and 10–20 mm. in length, under a compacting pressure of 3–5 T./cm.$^2$ by means of a hydraulic press or mechanical press like one which is commonly used in powder metallurgy. The pellets thus obtained are placed in a sintering furnace as shown in FIGURE 1 and FIGURE 2 and are heated for about 2–3 hours at a sintering temperature of 1,600–1,700° C. in a vacuum of $10^{-3}$ mm. Hg or a higher degree. Time required for raising the temperature is about 3–4 hours and cooling is effected by leaving the pellets in the furnace until they come down to a room temperature.

The accompanying drawings show for the purpose of exemplification without limiting the invention of claims thereto, certain embodiments illustrating the principles of this invention wherein:

Figure 1:
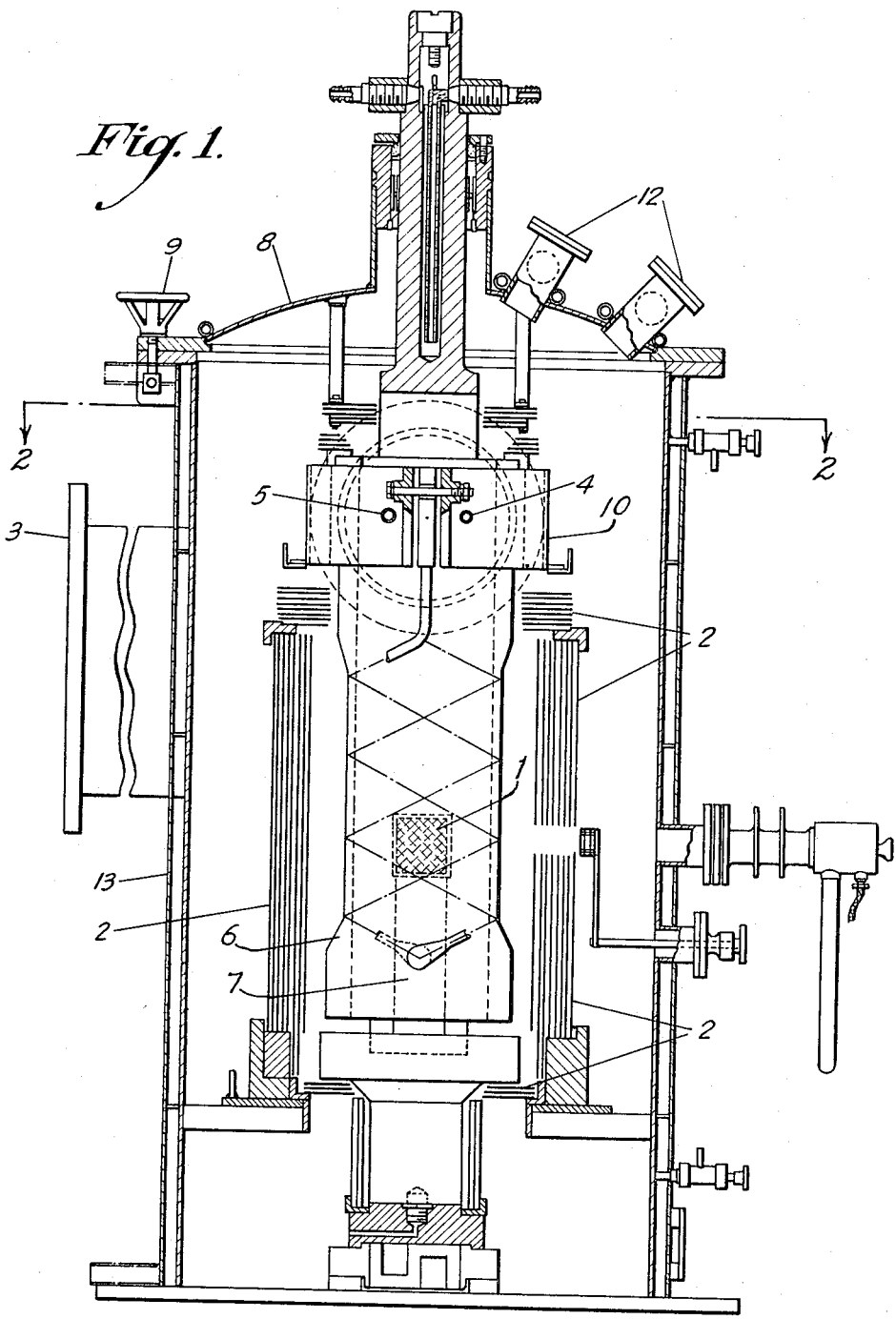
FIGURE 1 is a longitudinal sectional view of sintering furnace to produce the nuclear fuel material comprising this invention.
Figure 2:
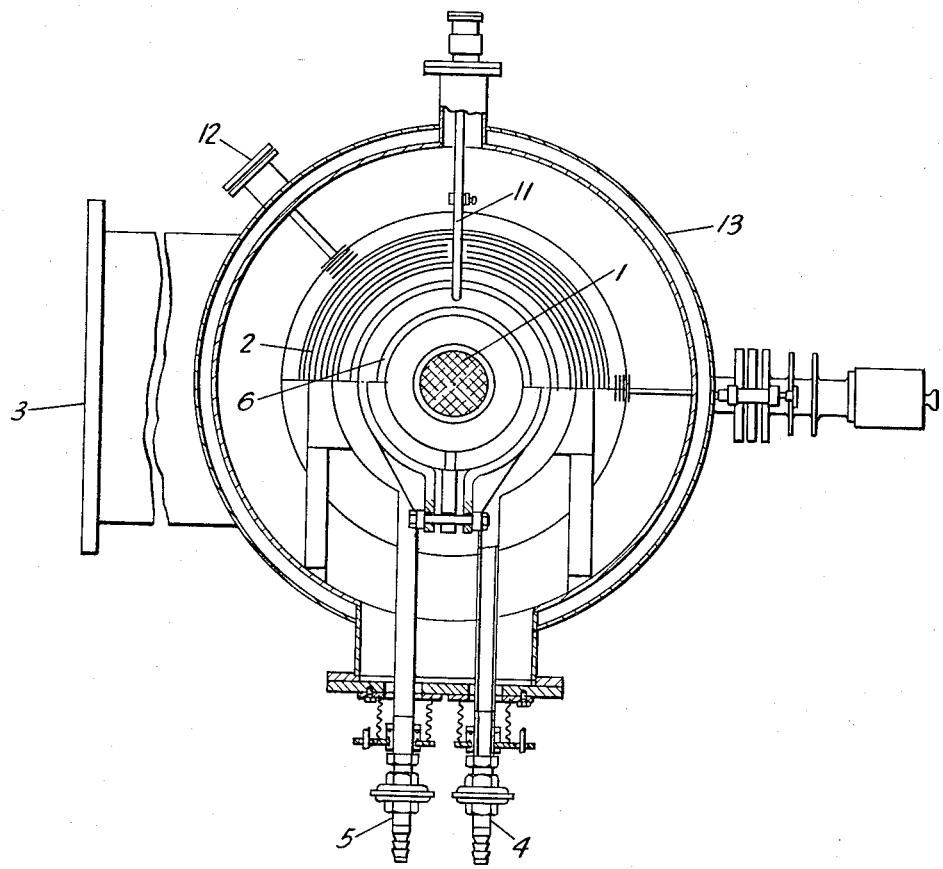
FIGURE 2 is a cross-sectional view along the line 2—2 of FIGURE 1.

The compacted material 1 is placed on the molybdenum stand 7 and, after closing the lid 8 tight by means of the handle 9, a vacuum of $10^{-3}$ mm. Hg or a higher degree is produced by means of a vacuum pump through the evacuation outlet 3. Current is caused to flow from the heating current inlet terminals 4 and 5 which are so constructed that the electrode flange 10 supporting the heating electrode 6 is cooled with running water in the interior. When the current flows to the spiral heating electrode made of graphite via one of the electrode flanges 10 connected to the current inlet terminal 4 there is generated Joule heat of about 2,000° C. The current then flows out to the current inlet terminal 5 via the other of the electrode flanges 10.

The heating temperature can be measured by means of an optical pyrometer through the air-tight window 12 as well as the thermoelectric couple 11. As the heating electrode can be heated to a temperature of 2,000° C. or more, it is possible to heat the compacted material to a temperature of 1,600° C. or more by radiation heat. The vacuum sintering furnace container 13 is cooled by the circulation of cooling water, while at the same time the heating electrode 6 is surrounded with heat shielding plates 2, so that it can withstand the high temperature in the interior.

The boron content of the sinered material obtained in this way was investigated by chemical analysis, and it was found that boron contained was in about the same quantity as it had been added. It has thus been confirmed that its quantity remaining contained is satisfactory.

If the addition of a metallic boride in accordance with the method of this invention is in a quantity exceeding 1%, a lowering of the sintered density occurs due to a lower content of $UO_2$ present. On the other hand, if the sintering temperature is 1,500° C. or lower, good fuel pellets will not be obtained, either. If the degree of the vacuum is less than $10^{-3}$ mm. Hg, there is a tendency that the boron compound remaining contains less of the boron compound. The quantity of boron compound remaining also showed a decrease where material compacted under a lower compacting pressure was sintered.

It is preferable that the grain size of the boron compound used as a burnable poison is within the range of one–several hundred $\mu$. If the grain size is too great, the sintered material is apt to become cracked. If it is too small, the quantity of boron compound remaining will be less.

Now we will explain the invention with reference to examples of practical application.

*Example of practical application 1*

0.1% by weight of $ZrB_2$ powder as an boron additive was added to and mixed with ceramic uranium dioxide powder, which was compacted into pellets, 15 mm. in diameter and 15 mm. in length, by a hydraulic press under a compacting pressure of 3 T./cm.$^2$ or more. These pellets were given sintering treatment for 2 hours, being heated to 1,600° C. in a high vacuum atmosphere of $10^{-4}$ mm. Hg. A good sintered product of 10.4 g./cc. density was thus obtained.

According to the results of chemical analysis of the above-mentioned sintered material, the boron content amounts to 0.08–0.10%. Furthermore, it has been found that the grain size of the dispersed and added $ZrB_2$ powder is within quite the same range of grain sizes as was before sintering (5–20$\mu$).

*Example of practical application 2*

0.01–1.00% $ZrB_2$ powder was added in quite the same way as in Example of Practical Application 1, and it was found that the amount of boron remaining in the sintered material was 70–90% of the original amount of the addition.

*Example of practical application 3*

0.01–1.00% $TiB_2$ and $CrB_2$ were used as a boron additive instead in quite the same way as in Example of Practical Application 1. The results obtained in respect of the density of the sintered material and boron content were almost similar to the result in the said examples of Application 1 and 2.

As stated above, the method of manufacturing nuclear fuel material according to this invention makes it possible to manufacture, in a very stable way, a nuclear fuel sintered material containing a desired amount of boron, there taking place little reaction between the metallic boride and the nuclear fuel compound and the melting point of the boron compound being high. This application is very efficient with all the ceramic nuclear fuel materials such as uranium dioxide, plutonium dioxide, thorium dioxide, uranium dioxide-thorium dioxide solid solution, uranium dioxide-plutonium dioxide solid solution, etc.

A nuclear fuel material can be produced in a most safe and efficient way by placing the pellets of burnable poison containing nuclear fuel material obtained in this way in a stainless steel or zircalloy cladding tube commonly in use.

Furthermore, the present invention, when necessary, furnishes the construction of a new nuclear fuel rod which is different from that mentioned above.

Generally speaking, the method of manufacturing a nuclear fuel rod in which a nuclear fuel material in a powdery condition is filled in a nuclear fuel cladding tube by the vibratory compacting technique is considered to be a hopeful method from the economical point of view because a reduction in manufacturing cost can be expected. It is therefore quite likely that a method in which the said burnable poison and oxide nuclear fuel are uniformly mixed and this uniform mixture of the powders is filled in the nuclear fuel cladding tube is readily thought of. It is generally known, however, that in filling a nuclear fuel cladding tube of requisite dimensions, the most efficient way of effective filling of high density is to use a powder consisting of particles of about three different grain sizes and disperse them uniformly.

As regards the above-mentioned three different kinds of grain sizes, it is considered that particles having a diameter of 50–100$\mu$ are suitable for the finest particles, those having a diameter of about $-42+100$ mesh suitable for medium particles and those having a diameter of about $-5+10$ mesh for the largest particles.

For the filling with a uniform mixing of burnable poison and oxide nuclear fuel, the uniformity of mixing was found still insufficient if oxide nuclear fuel or burnable poison of the said medium or maximum size was used. The burnable poison was not effective enough in such a case.

In order to surmount the above mentioned difficulty experienced in the past, it is possible to obtain a homogeneous powder of burnable poison containing nuclear fuel material of any one of the desired grain sizes by pulverizing the sintered material of the burnable poison containing nuclear fuel which is obtainable by the sintering method of the present invention. Thus it is possible to furnish easily and economically a burnable poison containing nuclear fuel rod of a uniform high density by filling a nuclear fuel cladding tube made of stainless steel or zircalloy with burnable poison containing nuclear fuel material of the said three grain sizes by the vibratory compacting technique.

Now we will give Examples of Practical Application in which the above-mentioned vibratory compacting technique is employed.

*Example of practical application 4*

Fused $UO_2$ powder of $-325$ mesh and $ZrB_2$ powder of 50–100$\mu$ were uniformly mixed at weight ratio of 1/15% in boron content and, after sintering, pulverized to a grain size of $-325$ mesh. Three kinds of powder, namely 15% of this powder, 20% of fused $UO_2$ powder of $-42+100$ mesh and 65% of fused $UO_2$ powder of $-5+10$ mesh, were uniformly mixed and a stainless steel tube, 12.5 mm. in diameter, 0.5 mm. in wall thickness and 1.5 m. in length, was filled with this mixture by the vibratory compacting technique. In this way we were successful in manufacturing fuel rods having a filling density of 86–88% of theoretical density and containing 0.1% boron. As a result of chemical analysis, it has been ascertained that the burnable poison in the above-mentioned fuel rods is dispersed uniformly in the longitudinal direction.

*Example of practical application 5*

In the said Example of Practical Application 4, $ZrB_2$ powder was used to make the finest particles. In this Example of Application, however, such borides as $ZrB_2$, $TiB_2$, $CrB_2$, $NbB_2$, etc. of a boron content of 0.01–1% were combined with $UO_2$ powder. Fine powder being used, after sintering, nuclear fuel rods of excellent boron dispersion were obtained by the vibratory compacting technique in quite the same way as in Example of Practical Application 4.

*Example of practical application 6*

The sintered material containing 0.1% $ZrB_2$ manufactured by the method of Example of Practical Application 1 was pulverized into powders having the three grain sizes of $-325$ mesh, $-42+100$ mesh and $-5+10$ mesh respectively. These powders were uniformly mixed in quantities of 15%, 20% and 65% respectively, in the same way as in Example of Practical Application 4. Fuel rods were made by filling stainless steel tubes with this mixture by the vibratory compacting technique.

In this case, the density of the powder was lower than the theoretical density of the said sintered material, so that the density upon vibratory compaction was 80–84% of the theoretical density.

In this case, every particle of the powder used contains burnable poison, so that the uniformity of the dispersion of boride in the fuel rod is exceedingly good.

As has been stated, the present invention is to furnish a nuclear fuel material of a high efficiency having a long life as a nuclear fuel, little reaction taking place between metallic boride as burnable poison and oxide nuclear fuel upon sintering, the melting point of the boride being high and the boron dispersed uniformly throughout the sintering nuclear fuel material.

What we claim are:

1. A method of manufacturing nuclear fuel material having prolonged fuel life which comprises the steps of mixing the powder of oxide nuclear fuel with the powder of at least one of $TiB_2$, $ZrB_2$, $CrB_2$, $NbB_2$ and $VB_2$, compacting the mixture under a compacting pressure of at least 3 T./cm.$^2$, and sintering the compacted mixture at a temperature of at least 1,500° C. in a high degree of vacuum of at least $10^{-3}$ mm. Hg.

2. A method of manufacturing nuclear fuel material having prolonged fuel life which comprises the steps of mixing the powder of uranium dioxide and the powder of at least one of $TiB_2$, $ZrB_2$, $CrB_2$, $NbB_2$ and $VB_2$, compacting the mixture under a compacting pressure of at least 3 T./cm.$^2$, and sintering the compacted mixture at a temperature of at least 1,500° C. in a high degree of vacuum of at least $10^{-3}$ mm. Hg.

3. A method of manufacturing nuclear fuel material having prolonged fuel life which comprises the steps of mixing the powder of oxide nuclear fuel with the powder of at least one of $TiB_2$, $ZrB_2$, $CrB_2$, $NbB_2$ and $VB_2$ having varied grain sizes compacting the mixture under a compacting pressure of at least 3 T./cm.$^2$, and sintering the compacted mixture at a temperature of at least 1,500° C. in a high degree of vacuum of at least $10^{-3}$ mm. Hg.

4. A method of manufacturing nuclear fuel material having prolonged fuel life which comprises the steps of mixing the powder of oxide nuclear fuel and the powder of at least one of $TiB_2$, $ZrB_2$, $CrB_2$, $NbB_2$ and $VB_2$ in such a way that the amount of boron contained will not exceed 1% of the total weight of the mixture of nuclear fuel compound, compacting the mixture under a compacting pressure of at least 3 T./cm.$^2$, and sintering the compacted mixture at a temperature of at least 1,500° C. in a high degree of vacuum of at least $10^{-3}$ mm. Hg.

5. The method of manufacturing nuclear fuel material of claim 1 characterized by the step of gradually cooling the sintered mixture to room temperature.

References Cited

UNITED STATES PATENTS

| | | | |
|---|---|---|---|
| 2,984,613 | 5/1961 | Bassett | 176—93 |
| 3,019,176 | 1/1962 | McReynolds et al. | 176—93 |
| 3,042,594 | 7/1962 | Hauth | 264—.5 |
| 3,051,566 | 8/1962 | Schwartz | 264—.5 |
| 3,122,484 | 2/1964 | Iskenderian | 176—93 |
| 3,122,509 | 2/1964 | Handwerk et al. | 264—.5 |
| 3,263,004 | 7/1966 | Bean | 264—.5 |
| 3,320,176 | 5/1967 | Davis | 252—301.1 |

L. DEWAYNE RUTLEDGE, *Primary Examiner.*

BENJAMIN R. PADGETT, CARL D. QUARFORTH,
*Examiners.*

S. J. LECHERT, Jr., *Assistant Examiner.*